Figure 1:
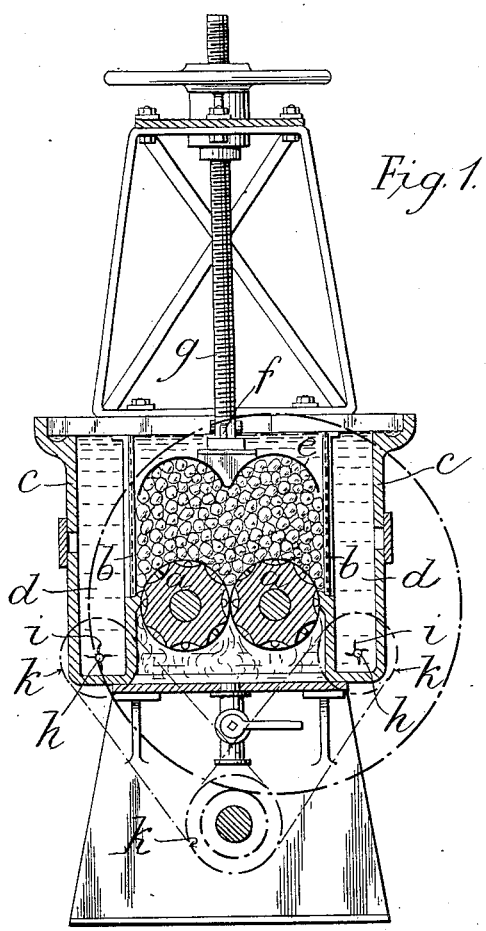

M. M. DESSAU.
APPARATUS FOR REMOVING FOREIGN MATTER FROM INDIA RUBBER, GUTTA PERCHA, BALATA, AND THE LIKE.
APPLICATION FILED NOV. 23, 1910.

999,100.

Patented July 25, 1911.

2 SHEETS—SHEET 1.

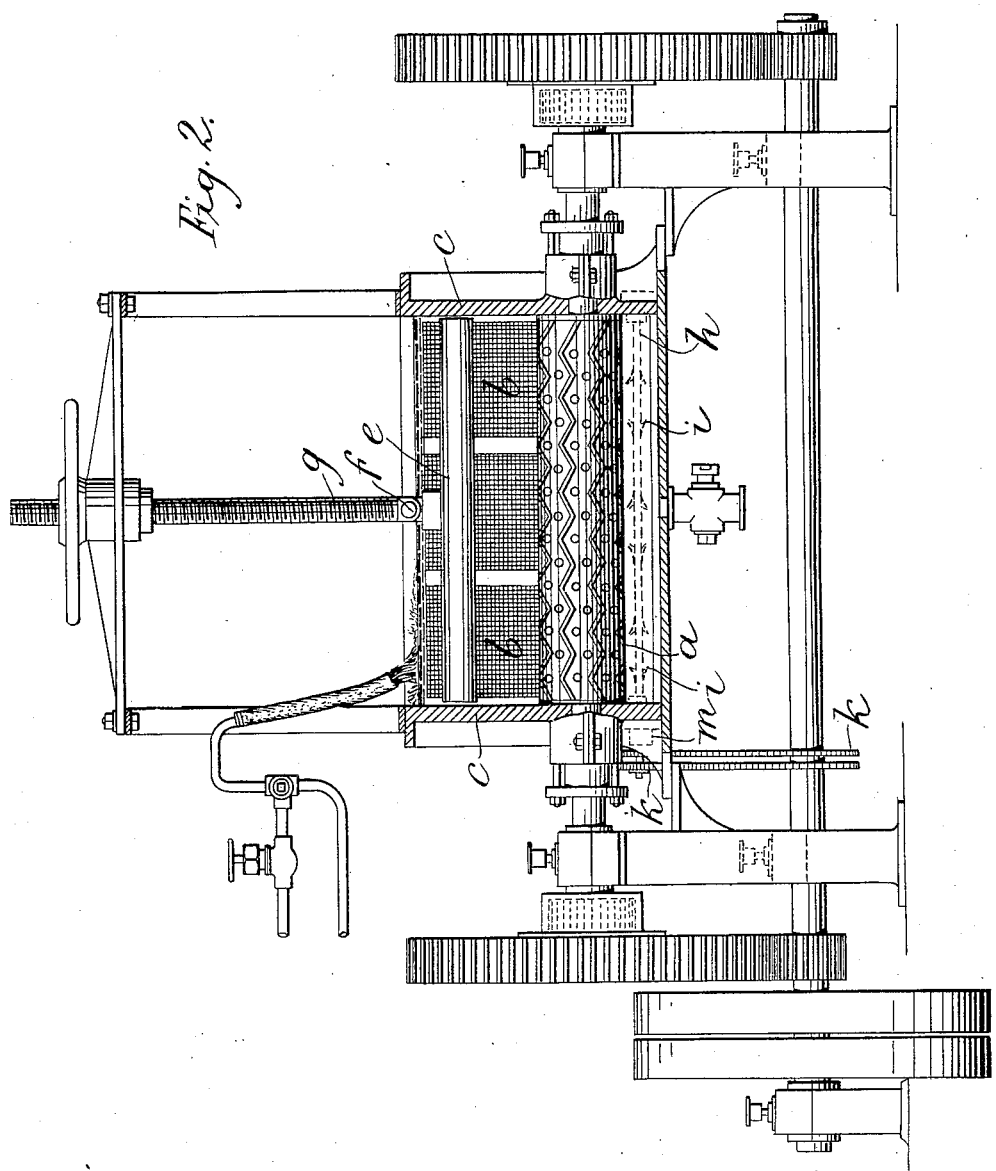

UNITED STATES PATENT OFFICE.

MORLAND MICHOLL DESSAU, OF LONDON, ENGLAND.

APPARATUS FOR REMOVING FOREIGN MATTER FROM INDIA-RUBBER, GUTTA-PERCHA, BALATA, AND THE LIKE.

999,100. Specification of Letters Patent. Patented July 25, 1911.

Application filed November 23, 1910. Serial No. 593,927.

*To all whom it may concern:*

Be it known that I, MORLAND MICHOLL DESSAU, a citizen of the United States of America, residing at London, England, have invented Improvements in Apparatus for Removing Foreign Matter from India-Rubber, Gutta-Percha, Balata, and the Like, of which the following is a specification.

In apparatus designed to subject crude india rubber, gutta percha, balata and the like (hereinafter referred to as rubber) to the action of rolls in the presence of water for the purpose of liberating or washing out impurities, it is found that heavier particles of the impurities settle upon the rubber and also collect in the usual space or chamber, or spaces or chambers containing the washing liquid, with the result that such impurities are again taken up by the rubber so that although actually cleaned, the rubber is liable to be again made dirty.

The object of this invention is to avoid this objection by keeping all impurities removed from the rubber in suspension in the washing water, so that they can be readily removed with the overflow water and thus be prevented from being again taken up by the rubber. For this purpose means are provided for continuously agitating the liquid in the region or regions where settling of the impurities tends to occur. The agitation may be effected by one or more stirring devices of any suitable kind, depending upon the form of the washing machine to which the invention is applied.

In the accompanying drawings, Figures 1 and 2 are sectional elevations, at right angles one to another, of a rubber washing machine embodying the invention.

In this example, the washing machine has a pair of rolls $a$ located between walls or screens $b$ in a trough $c$ with an overflow space $d$ at each side into which water surges under the action of a platen $e$ that is jointed at $f$ to a vertically adjustable screw $g$ so that it is adapted to rock as the rubber under treatment moves on its passage to and between the rolls and produce a surging action on the water fed into the machine. A spindle $h$ is mounted with its axis parallel to the axes of the rolls $a$, in the lower or other part of each of the overflow spaces $d$ between the walls or screens $b$ and the outer walls of the trough $c$. Each spindle $h$ is provided with a series of blades, arms or fins $i$ (hereinafter called blades) arranged radially, or at a suitable inclination to the spindle. The blades $i$ may all be alike, or they may be dissimilar, so as to tend to produce motion of the water, in which they are immersed, in one direction or in a number of different directions at one time and thus effectually prevent heavy particles settling upon the rubber or in the spaces $d$, and insure their being kept in suspension until removed from the machine. Conveniently, the blades $i$ may extend with an inclination longitudinally of the spindle $h$ and extend alternately in opposite directions as shown. The spindles may be operated in any suitable way, as by chain and sprocket gearing $k$, stuffing boxes $m$ being provided, where required, to secure fluid tightness of the overflow spaces $d$ where the spindles $h$ pass through the end wall or walls thereof.

The particular washing machine hereinbefore referred to and taken as an example for embodying the present invention, forms the subject of Letters Patent No. 960846. The invention can however be applied in connection with washing machines of various kinds designed for removing impurities from india rubber and like material and having one or more water spaces wherein heavy particles might collect.

What I claim is:—

1. In a rubber washing machine, a trough having an overflow at the top and perforated side walls or screens arranged to form within the trough a central rubber washing compartment and with the sides of the trough, separate liquid spaces closed at the bottom and communicating with the overflow at the top, rubber washing rolls in said central compartment, agitating devices arranged in the lower portions of said liquid spaces and means for driving said agitating devices.

2. In a rubber washing machine, the combination with a trough, a pair of rolls therein, a platen mounted to oscillate above said rolls, and perforated side walls or screens arranged to form within the trough a rubber washing compartment containing the rolls and platen and with the side walls of the trough liquid spaces communicating with an overflow, of rotary agitators mounted in said liquid spaces and means for operating said agitators.

3. In a rubber washing machine, the combination with a trough, a pair of rolls therein, a platen mounted to oscillate above said rolls, and perforated side walls or screens arranged to form within the trough a rubber washing compartment containing the rolls and platen and with the side walls of the trough liquid spaces communicating with an overflow, of rotary spindles arranged in said liquid spaces parallel to the rolls and formed with longitudinally extending blades extending in opposite directions to each other, and means for rotating said spindles.

Signed at London England this 17th day of October 1910.

MORLAND MICHOLL DESSAU.

Witnesses:
HUGH HUGHES,
CHARLES COPS.